United States Patent

[11] 3,627,708

| [72] | Inventors | Lewis D. Morse<br>Princeton;<br>Warren T. Grundner, Vincentown; Calvin Calmon, Birmingham, all of N.J. |
|---|---|---|
| [21] | Appl. No. | 750,254 |
| [22] | Filed | Aug. 5, 1968 |
| [45] | Patented | Dec. 14, 1971 |
| [73] | Assignee | Sybron Corporation |

[54] MACROPOROUS CROSS-LINKED COPOLYMERS AND PROCESS THEREFOR
21 Claims, 5 Drawing Figs.

[52] U.S. Cl. ................................................ 260/2.5 B,
260/2.1 E, 260/2.2 R, 260/23 S, 260/80.78,
260/88.2 C, 260/88.2 S
[51] Int. Cl. ....................................................... C08f 15/04,
C08f 47/08
[50] Field of Search ............................................ 260/2.1 E,
2.2, 2.5 R, 2.5 B, 2.5 M, 88.2 C

[56] References Cited
UNITED STATES PATENTS

| 3,322,695 | 5/1967 | Alfrey et al. ................. | 260/2.1 E |
| 3,357,158 | 12/1967 | Hollis ............................ | 260/2.5 |
| 3,367,889 | 2/1968 | Oline ............................. | 260/2.1 E |
| 3,418,262 | 12/1968 | Werotte et al. ............... | 260/2.5 B |

FOREIGN PATENTS

| 932,125 | 7/1963 | Great Britain ................. | 260/2.5 B |

Primary Examiner—Murray Tillman
Assistant Examiner—Wilbert J. Briggs, Sr.
Attorney—Theodore B. Roessel ABSTRACT: A macroporous organic cross-linked copolymer formed by a free-radical-type polymerization of a mixture of monomers in the presence of a precipitant which is substantially immiscible with the monomer mixture, but which is solubilized within said monomer mixture by a micelle-forming mechanism. A typical example would be a polymerization of a styrene, ethyl vinyl benzene, divinylbenzene monomer mixture in the presence of water, water being immiscible with the monomer mixture which is solubilized with sodium bis (2-ethyl hexyl) sulfosuccinate.

INVENTORS
LEWIS D. MORSE
CALVIN CALMON
WARREN T. GRUNDNER

BY Theodore B. Roessel
ATTORNEY

MACROPOROUS CROSS-LINKED COPOLYMERS AND PROCESS THEREFOR

This invention relates to synthetic resin articles having a porous structure of the general type previously referred to in the art as macroporous, macroreticular, or as having microscopic channels. Such articles hereinafter referred to as macroporous articles have been found to possess certain advantages when compared to prior art gel or "microporous" resins. The most prominent of these advantages is increased mechanical strength while maintaining permeability to fluids. This in turn facilitates the flow and diffusion of liquid phases through the resin article and enhances the usefulness of such articles for processes such as ion-exchanges, absorbing, adsorbing, catalyzing, etc.

The prior art teaches that macroporous resins may be prepared through a process wherein suitable monomers are polymerized either by bulk or suspension techniques in the presence of compounds arbitrarily referred to as "precipitants." These prior art precipitants are generally defined as compounds that form homogeneous solutions with the monomer mixture, but do not act as either solvents or as swelling agents for the copolymers. They are in all cases substantially insoluble in water and are generally organic liquids. It is believed that the macroporous structures resulting from copolymerization in the presence of such prior art precipitants is due to the dilution of the monomer mixture with a substance with which it is miscible, but which diluent does not solvate the growing polymer chains. In the presence of such a poor solvating environment, the networks of growing chains do not swell appreciably (Refer to Millar, et al., J. Chem. Soc. (London), 1965, pages 308–310). Growing polymer spheroids result, which are dispersed throughout the monomer-precipitant environment. They have hard, dense centers, as shown by electronmicrophotographs of cross-sectional slices of the resin. As the monomer becomes depleted the spheroids come into contact with one another; their surfaces, still containing free radical propagation sites, join chemically to form aggregates of microbeads. The result upon completion of polymerization is a macroporous structure containing relatively large intercommunicative channels.

The macroporous articles so produced generally show far greater pore or void capacity than the gel resins, and thus provide a far greater diffusivity space therein for liquids and ions or other microscopic entities borne by fluids diffusing therethrough. While the gel resins in a dry state show no pores or voids even at electronmicrograph magnifications of $1\times10^5$, and even in a fully swollen state have pore diameters of about 30 angstroms, the macroporous resins in contradistinction show well-defined channels of fairly uniform diameter in a dry state even at $1\times10^3$ magnification. These channels may range from about 300 to 1,400 angstroms in diameter, such diameter size largely depending upon the volume percent of organic solvent-precipitant to volume percent of monomers initially used in their preparation. This phenomenon is discussed in the paper titled "Macroreticular Anion Exchange Resins," by Downing et al., International Water Conference (Pittsburgh, Pa., Oct. 1963).

However, notwithstanding the above discussed and art-recognized advantages of macroporous resin articles, these advantages have not been obtained without certain mechanical and chemical deficiencies in the articles themselves nor without certain substantial disadvantages in the methods of preparing such articles.

Among the disadvantages of prior art macroporous resin articles is the substantial lack of uniformity or homogeneity of the resin wall structure. This lack of homogeneity is explained by the mechanism of formation. Since the resin structure is composed of conglomerations of polymer microbead aggregates of varying densities, and since the microbead aggregates are largely only surface-fused, the points of fusion of the beads are necessarily of substantially different densities and mechanical structure than their central portions. This results in the formation therein of chemical and mechanical weak points of reduced density where the beads join, which weak points are more prone to scission than other more dense polymer portions.

It is thus an object of this invention to provide a macroporous resin article where the polymer portions are of substantially uniform mechanical structure and density.

It is a further object of this invention to provide a macroporous ion exchange article having improved ion exchange capacity per unit weight of polymer.

Another object of this invention is to provide an ion exchange article having enhanced resistance to degradation by chemical attack.

Another object of this invention is to provide an ion exchange article having increased resistance to organic foulants.

These and other objects and advantages of this invention will be apparent from a consideration of the following detailed description of the invention and by reference to the drawings wherein:

FIG. 1, a fragmentary view, partially of the surface and in partial section, shows the internal uniform polymer structure and density, and the internal intercommunicating macropore network of a resin article of the invention;

Figures 1, 2:
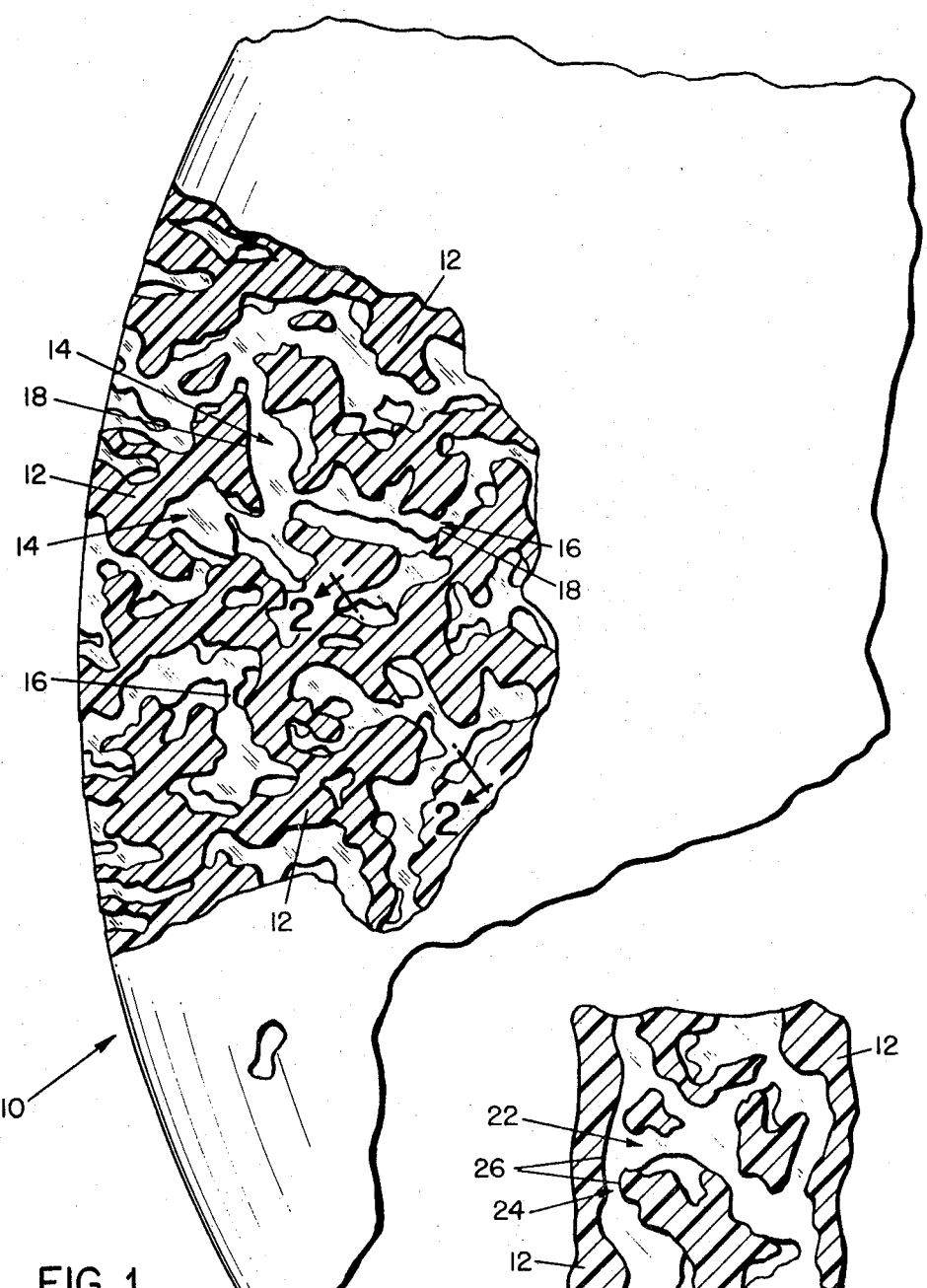
FIG. 2 is a view in partial cross section of the resin article of FIG. 1 taken along line 2—2.
Figure 4:
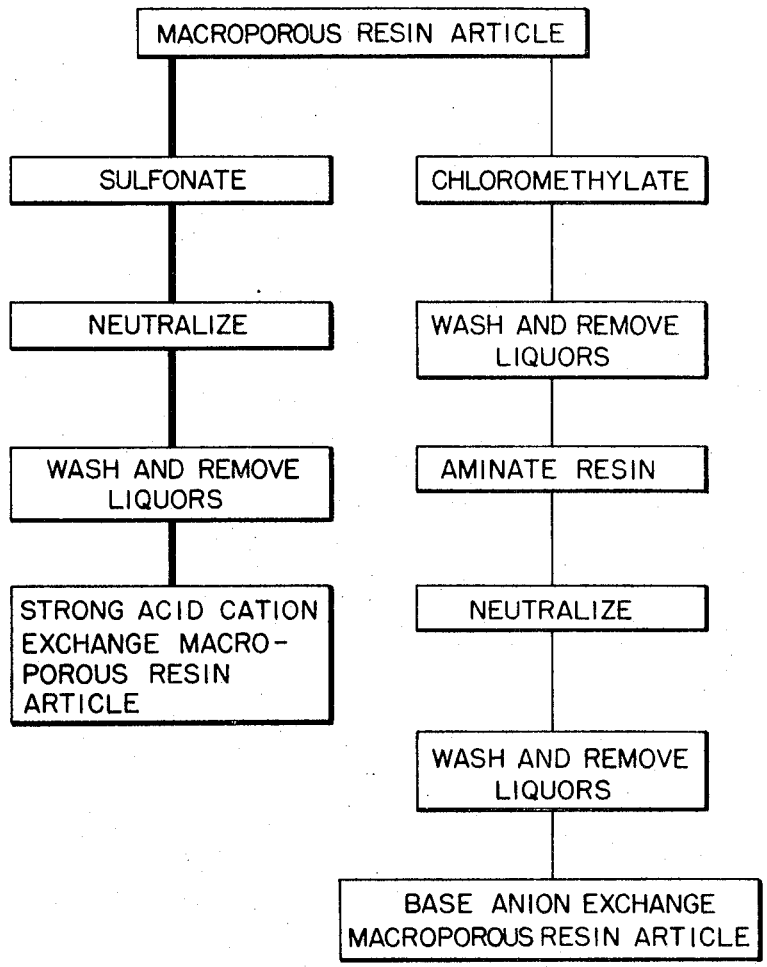
Figure 5:
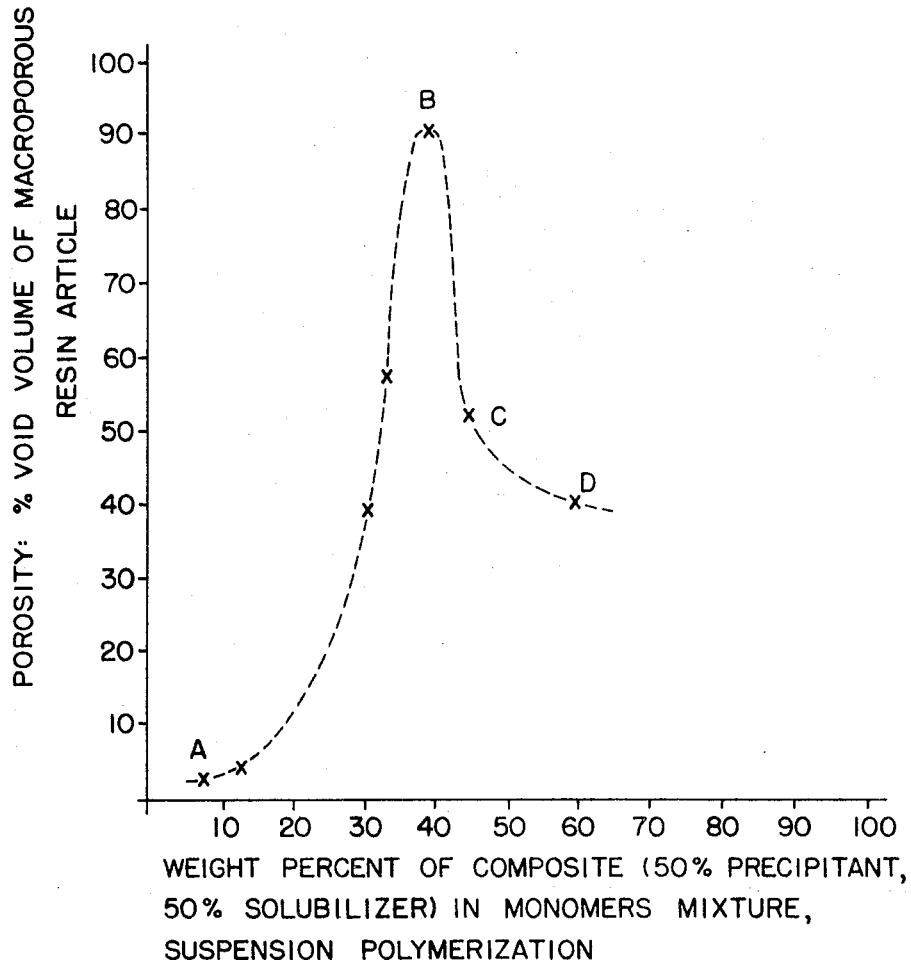

FIG. 4 is a process flow chart for the conversion of the present macroporous article to anion and cation exchange macroporous resin articles of FIG. 1; and FIG. 5 is a graph showing the change in porosity (void volume) of one embodiment of the present macroporous resin article of FIG. 1 with the percent by weight of a pore-forming composite used in a suspension polymerization process of the invention.

We have found that the object and advantages of this invention are achieved by including in a monomer mixture during free radical-type polymerization, a precipitant that is normally not soluble within the monomer mixture, but is solubilized therein through the further addition of a micelle-forming compound that acts as a solubilizer for the precipitant and is itself soluble within the monomer mixture.

Precipitants useful in this invention are those having a high dielectric constant in comparison with the monomer mixture such as, for example, water, acetamide, monomer insoluble glycols, methyl sulfate and succinonitrile.

Preferred micelle-forming forming solubilizers used in this invention and discussed in further detail hereinafter are sodium bis (2-ethyl hexyl) sulfosuccinate, dodecylammonium butyrate, oleate or formate and the bis esters of sodium sulfosuccinic acid and alcohols having four to 18 carbon atoms.

In general, macroporous resin articles may be provided according to the invention by bulk or by suspension copolymerization of liquid organic polymerizable monomers, such as polyene monomers, at least one of which is polyfunctional, and acts as a "cross-linking agent," in the presence of (a) a polymerization catalyst and (b) a substantially uniform dispersion or solution in the monomer mixture of a liquid pore-forming composite containing (1) an inert polymer-insoluble and monomer phobic or monomer insoluble pore-forming "precipitant" and (2) an inert polymer-soluble and micelle-forming solubilizer component, which solubilizer is above its critical micelle concentration and is miscible both with the monomers and also with the precipitant at the polymerization temperatures. By "inert" is meant, according to the invention, a substance that is substantially inert to chemical reaction with the components employed in the polymerization process.

A fuller understanding of the nature of the article and process of this invention may be had through a detailed consideration of the drawings.

FIGS. 1 and 2 illustrate in an enlarged view the structure of a macroporous resin article, according to the invention, designated generally as 10. Article 10 comprises a crosslinked copolymer 12 having scattered throughout a multiplicity of macropores 14. Macropores 14 intercommunicate with each other within the body of article 10 and with the surface of article 10 through restricted channels 16 and are defined by the substantially uniform and continuous internal structural walls 18 of copolymer 12.

The three-dimensional nature of the intercommunicating porous network may more clearly be seen by reference to FIG. 2 which is an enlarged section of FIG. 1 taken at line 2—2. Therein, a copolymer portion 12 defines one wall 19 of a macropore 20.

Macropore 20 is shown to communicate at one end with an "upper" macropore 22 through a constricted channel 24, which is defined by copolymer wall 26.

It is thus apparent that an extensive three-dimensional intercommunication among macropores exists by means of constricted channels, to provide throughout the article an internal resin structure and macropore network which tends to provide both a maximum of resin wall area for adsorption, absorption and chemical reaction sites on the internal polymer walls of the porous network for contact with the materials diffusing therethrough. It is to be further noted that substantially all of the polymer portions in the resin article interconnect with one another and are fused in such manner that the polymer in the resin article is of substantially uniform density, and thus, is substantially uniform both in chemical and mechanical structure.

Figure 3:
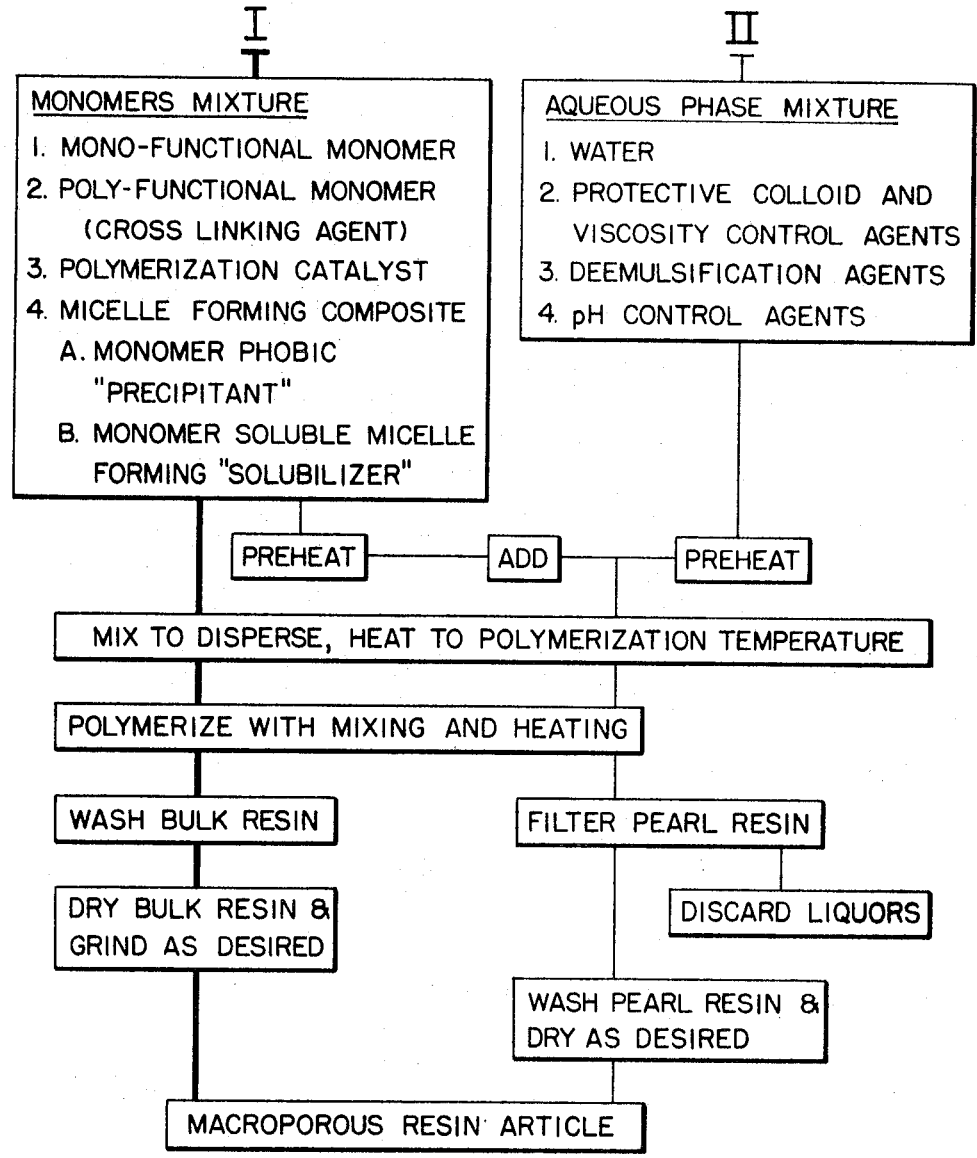
FIG. 3 is a flow diagram of embodiments of sundry polymerization processes of this invention which provide certain embodiments of the macroporous article of FIG. 1.

FIG. 3 diagrams the steps employed in providing the macropore articles of this invention using bulk or suspension polymerization methods. Bulk polymerization route I follows heavy lead lines, while suspension polymerization route II follows light lead lines.

In both the bulk and suspension polymerization processes a liquid mixture of monomers is formed using at least one monofunctional monomer, at least one polyfunctional monomer, a polymerization catalyst and a micelle-forming composite of the invention.

In the bulk polymerization route, the "monomer mixture" components are admixed at a suitable temperature to form a solution. The monomers are then polymerized at effective polymerization temperatures therefor with mixing for an effective interval to form in time a solid bulk resin. The bulk resin is then washed free of the liquid composite that remains within its intercommunicating macropores and constricted channel network. If desired, the bulk resin may be dried of wash and other liquors and then may be ground to any desired particle size to provide a granular macroporous resin article of the invention.

In suspension polymerization route II, the "monomer mixture" is formed as was described above. In addition, an "aqueous phase mixture" is prepared containing water, protective colloid and viscosity control agents whose purpose is to promote formation of resin pearls of a particular range of particle sizes. Further, pH control agents are added to the aqueous phase mixture where deemed desirably to protect pH sensitive materials in the reaction mixture, such as protective colloid and viscosity control agents, and to avoid degradation of functional properties needed to provide the end article.

Both the monomer mixture and the aqueous phase mixture desirably are preheated separately to temperatures at or somewhat below the polymerization temperatures of the monomers prior to their admixture. It has been discovered that such preheating helps control the pearl size of the resin article ultimately produced, presumably by swelling the solubilizer micelles more completely with the monomer phobic ingredient and thereby reducing the effectiveness of the solubilizer in lowering the surface tension at the monomer phase-aqueous phase boundary. The monomer mixture is added to the aqueous phase mixture with mixing so as to disperse the monomers in the aqueous phase and to provide an oil-in-water type dispersion. The admixed oil-in-water type dispersion is heated to polymerization temperatures with mixing and maintained thereat until the specific gravity of the resin beads produced has exceeded 1.0, i.e., the beads sink in tapwater. The bead slurry obtained is then post heated at or somewhat above polymerization temperatures for an effective interval until the beads are polymerized to their fullest practical extent. Thereupon the reaction liquors are separated from the resin bead articles, and the resin beads obtained may be then washed free of occluded liquid composite and dried, if desired, to provide articles of this invention.

Thus, may be described, in general, the bulk and suspension polymerization methods for providing macroporous resin articles of this invention. Details concerning specific procedures are exemplified more fully below.

FIG. 4 diagrams the process employed to provide cation exchange macroporous articles of the invention, by steps joined with heavy lead lines, and anion exchange macroporous articles produced by steps joined with light lead lines. Although the process steps in and of themselves are well known to the art, and of themselves do not form part of this invention, the unique macroporous ion exchange resin articles provided by such treatments are new. The latter articles are unusual in that they provide a greater ion exchange capacity per unit weight of polymer than was heretofore known of prior art macroporous resin articles. Ion exchange macroporous resin articles made in accordance with this invention also exhibit the added benefits of a more uniform polymer density and structure and an enhanced resistance to depolymerization or degradation even when subjected to chemical agents which tend to attack the resin articles, plus increased resistance to organic foulants.

In general the macroporous cation exchange resin articles shown in FIG. 4 are obtained by treating the macroporous resin articles of FIG. 1 produced by the process of FIG. 3 with any of the well-known sulfonating agents used in the art. The reaction mixture obtained is then neutralized optionally with an otherwise inert or innocuous base. The sulfonated resin provided is washed free of reaction liquors. The wash liquors are then removed such as by filtration to provide the desired macroporous cation exchange resin articles.

To provide macroporous anion exchange resin articles of the invention, the macroporous resin article of FIG. 1 produced by the process of FIG. 3 are chloromethylated with any of the well-known chloromethylating agents used in the art. The reaction mixture obtained is then washed free of excess reactants and the wash liquors are removed such as by filtration to provide a chloromethylated macroporous resin an article of the invention. The chloromethylated resin article is then aminated with agents chosen from among any of those known to the art, to yield either a strong or weak base anion exchange resin. The reaction mixture produced is then neutralized optionally with an otherwise inert or innocuous acid. The aminated macroporous resin articles so obtained are then washed free of reactive agents. The wash liquors subsequently are removed as by filtration to provide anion exchange macroporous resin articles of the present invention.

Details concerning specific reaction and process conditions for providing specific embodiments of cation and anion exchange macroporous resin articles of the invention are more fully set out in the descriptions and example below.

The examples which follow illustrate preferred ways to practice the invention but are not intended to be definitive of its scope.

FIG. 5 is a graphic showing of the relationship between porosity and composite concentration of eight macroporous resin articles prepared to set forth in examples 1 through 8 below.

EXAMPLES 1 TO 8—FIG. 5

These examples show the interdependency of the amount of precipitant and micelle-forming compound used in the instant process and the porosity obtained in the resultant macroporous resin article. The particular process used here is suspension interpolymerization in aqueous medium of linear polymer formers styrene and ethyl vinyl benzene, monoolefinic vinyl aromatic monomers, and divinyl benzene, a difunctional cross-linking monomer which was used in quantities to provide on the order of 20 percent cross-linking in the resultant interpolymer.

The precipitant employed was water while the micelle-forming solubilizer component used was sodium bis (2-ethyl hexyl) sulfosuccinate, commercially known as Aerosol-OT. In these experiments the precipitant and solubilizer were used in a 1/1 ratio by weight with regard to one another. The sulfosuccinate employed here is highly soluble in the water and is used in quantities greater than the critical micelle concentration so as to assure micelle formation in the monomers phase. Further, the sulfosuccinate is soluble in the monomers employed but is otherwise nonreactive therewith. The precipitant water was chosen because of its pronounced inert yet monomerphobic nature, having a dielectric constant of about 40 as compared with that of about 1 to 8 for the organic monomers. In addition, use of water substantially obviates any fire hazard in the removal of composite from the polymer articles obtained and is comparatively inexpensive when compared with prior art organic liquid precipitants. Use of water as the precipitant provides an advantage of easy removal of the composite from the articles formed. This precipitant may then be discarded without presenting the substantial waste treatment or recovery and reuse problems occasioned by use of most organic solvent precipitants of the prior art.

With regard to the procedure used, a monomers mixture and an aqueous phase mixture were separately formed of the ingredients and in the amounts shown in table I below.

The aqueous phase mixture contained, as buffer, phosphates so as to maintain a pH of about 10.5 therein. Gelatin and gum arabic were used as protective colloid materials in the aqueous phase to help prevent agglomeration of the monomer droplets during polymerization and agglomeration of the macroporous resin pearls during their formation.

The sodium chloride was added to function advantageously in several ways: first, to aid in controlling the average size and ranges of size of the monomer phase droplets during polymerization and thus to control the size of the resultant macroporous pocket-pore polymer beads provided; second, when used, as here, in quantities of 0.1 to 10 percent wt./wt. of the aqueous phase, to provide a required delicate balance in the suspension polymerization between leaching water-soluble composite from the monomers phase into the aqueous phase so as to help regulate the degree of macroporosity, and providing proper ionic strength to the aqueous phase so as to aid the buffer in maintaining the prior charge on the polyelectrolyte protective colloid and thus prevent emulsification; third, when used in the proper quantities recited above, to substantially reduce the "water retention" properties of the end macroporous article thus permitting an easier washing and drying of the article and a more facile diffusion of chemical entities borne by fluids passing through the resin article. When however, no sodium chloride is used, as in example 13 hereunder, other valuable macroporous articles of the invention are obtained which have high water retention properties; this is a distinct advantage in certain instances, such as, when the end use of the article is as a "carrier" such as for catalysts adsorbed within the macropore systems where high water retention provides for a slower rate controlled release of catalysts into systems requiring such. Further, the absence of sodium chloride helps to provide droplets approaching emulsion size but of a very high degree of porosity where very fine, dustlike, particles having a high degree of porosity are desired. Such products are particularly useful in fluidized bed reaction systems. The aqueous phase mixture, so prepared was heated to 84° C.

In preparing the monomers phase, the quantities of styrene, divinyl benzene and ethyl vinyl benzene recited in table I were admixed. The divinyl benzene and ethyl vinyl benzene employed were present, initially, as a mixture of 55 percent wt./wt. of the former, the cross-linking agent, and 45 percent wt./wt. of the latter; this mixture is a common commercial product. Thus, the end interpolymer obtained in the articles produced was a terpolymer of the three monomers having 18.6 percent by weight of cross-linking due to the divinyl benzene moieties.

The quantities of sodium bis (2-ethyl hexyl) sulfosuccinate recited in table I were added to and dissolved in the mixture of monomers. The solubilizer so added was in the form of the succinate 75 percent wt./wt. dissolved in 25 percent water wt./wt. Additional quantities of water were then added and mixed with the aforesaid solution so as to bring the ratio of solubilizer to water precipitant to a 1/1 ratio wt/wt and to provide the quantities of water in the amounts listed in table I.

The monomers admixture at ambient temperature, about 23° C., was hazy, indicating that not all of the water was taken up by the succinate micelles in the monomers at this temperature. However, upon moderate heating to 60° C., the monomers mixture became a clear single phase thus indicating that all water added was then taken up by the micelles. It should be noted in this regard that water in the quantities employed here would not be miscible with the monomers, regardless of the temperature employed and in the absence of a micelle-forming solubilizer such as here used.

The catalyst, benzoyl peroxide, was dissolved in the monomers mixture just prior to the latter's addition to the water phase mixture.

Upon addition of the monomers mixture to the aqueous phase with stirring, the temperature of the aqueous phase fell to about 76° C. Stirring was maintained to provide an oil-in-water-type suspension of monomers phase in aqueous phase.

TABLE I

| Polymerization Recipes for Examples 1 to 8 | |
|---|---|
| Component | Parts by Weight |
| Aqueous Phase Mixture | |
| Demineralized Water | 660.0 |
| Na$_3$PO$_4$·12H$_2$O | 4.95 |
| Na$_2$HPO$_4$ | 14.85 |
| Na Cl. | 19.8 |
| Gelatin | 0.495 |
| Gum Arabic | 1.485 |
| Monomers Mixtures | |
| Styrene | 395 |
| Ethyl Vinyl Benzene 92 | |
| Divinyl Benzene | 113 |
| Precipitate-Solubilizer | (a) |
| Example 1 | 24 |
| Example 2 | 72 |
| Example 3 | 120 |
| Example 4 | 180 |
| Example 5 | 210 |
| Example 6 | 240 |
| Example 7 | 252 |
| Example 8 | 360 |

(a) Composite was in ratio of 1/1 wt./wt. of sodium bis (2-ethyl hexyl succinate)water The reaction admixture obtained was then heated to 80° C., an interpolymerization temperature, and maintained thereat with stirring until the polymer pearls or beads which formed attained a specific gravity greater than tap water, i.e., of more than 1.0. This was determined by abstracting at diverse times samples of the beads formed and noting whether they sank or floated in tap water. At this point, the polymerization was deemed complete and occurred within about 2 hours at 80° C. The beads were then separated from their reaction liquors by decantation or filtration. The resinous articles so obtained had a U.S.S.S. mesh size between −20 and +50.

A comparison of the percent of precipitate-solubilizer solution in the monomers phase with the porosity of macroporous resin articles obtained in examples 1 to 8 above is shown in table II below and in FIG. 5.

TABLE II.—POROSITY VS. WEIGHT PERCENT OF COMPOSITE IN MONOMERS MIXTURE—FIG. 5

| Example | Percent precipitant solubilizer [1] | Approximate percent porosity | Porosity in ml. of voids/ gram of resinous article [2] |
|---|---|---|---|
| 1 | 4 | 1.9 | 0.0185 |
| 2 | 12 | 2.6 | 0.0261 |
| 3 | 20 | 9.5 | 0.0951 |
| 4 | 30 | 39.3 | 0.393 |
| 5 | 35 | 55.8 | 0.558 |
| 6 | 40 | 90 | 0.90 |
| 7 | 42 | 52.5 | 0.525 |
| 8 | 60 | 38.5 | 0.385 |

[1] Based on wt. monomers in monomers mixture.
[2] Porosity was determined according to the dye procedure given by Parrish in J. Appl. Chem. 15 280 (1965).

FIG. 5 graphs the change in porosity with percent of composite and plots and points given in table II, wherein porosity seems to increase almost sinusoidally from point A to reach a maximum at point B. Thereupon, porosity decreases with use of more than 40 percent 1/1 precipitate-solubilizer solution to follow, in mirror image, curve BA until point C is reached; beyond point C porosity decreases at a slower rate with increased precipitate-solubilizer solution, almost flattening to a constant value at point D. This figure indicates that one may obtain a maximum porosity, of as much as, or perhaps even exceeding 90 percent by volume of the present macroporous article by use of suspension polymerization techniques in the process of this invention.

Thus, it may reasonably be deemed well within the purview of one familiar with interpolymerization techniques, in light of the present teachings above and hereunder, to provide macroporous resin articles of the invention with any desired and prescribed degree of porosity by selectively varying the amount of precipitant-solubilizer used, the ratios and chemical types of precipitant and/or solubilizer used, the nature and amount of cross-linking in the interpolymer and so forth.

The resin articles obtained in these examples have the structure shown in FIG. 1 and may be used or subsequently treated to provide articles suitable for any of the diverse purposes given herein.

EXAMPLES 9 TO 14

These examples illustrate the high mechanical strength cation exchange and diffusivity properties and the high resistance to oxidation of macroporous resin articles of the invention (examples 9 to 12) as contrasted with those properties of an otherwise identical but prior art gel resin (example 14). Example 13 is illustrative of useful macroporous resin articles of the invention of very high porosity prepared by an oil-in-water-type emulsion polymerization technique.

EXAMPLE 9

A monomers mixture was prepared according to the following recipe:

| Component | Parts by Weight |
|---|---|
| Styrene | 379 |
| Ethyl Vinyl Benzene | 101 |
| Divinylbenzene | 120 |
| Benzoyl Peroxide | 3.6 |
| Sodium Bis (2-ethyl hexyl) Sulfosuccinate | 60 |
| Water | 60 |

An aqueous phase mixture was also prepared comprising:

| Component | Parts by Weight | |
|---|---|---|
| Water | 660 | |
| Sodium Hydroxide | 2.05 | Buffered, pH 9.0 |
| Boric Acid | 0.56 | |
| Gelatin | 1.32 | |
| Gum Arabic | 3.96 | |
| Sodium Chloride | 33.0 | |

The monomers mixture was slowly added with stirring to the aqueous phase mixture at room temperature, about 20°–25° C., to provide a uniform oil-in-water-type dispersion. The suspension obtained was heated with mixing to a temperature range of 68° to 72° C., which took about 45 minutes, and maintained thereat for about 5.75 hours until the monomers mixture polymerized to form resin beads. At this time a sample of the resin beads was dense enough to settle in tap water, and the reaction mixture was "post" heated to 80° C., to assure complete interpolymerization. The bead-liquor slurry was then permitted to cool and the aqueous phase liquors were decanted to separate out the beads. The wet beads were then washed with water to remove aqueous phase liquors adhering to the surface thereof and also to remove precipitate-solubilizer occluded within the intercommunicating macroporous channel network of the beads. The beads obtained were then dried to remove the water wash liquors. The beads were suitable for use as absorbent or catalyst carrying agents or for further treatment such as to provide ion exchange macroporous articles of the invention.

The dry macroporous beads, obtained as above, were "solvent" sulfonated to provide strong acid cation exchange macroporous resin articles of the invention as follows. Initially, 100 parts by weight of the aforesaid dry pocket-pore resin pearl articles of the invention were dispersed in 250 parts by weight of propylene dichloride. The dispersion was heated with stirring to 110° C. Approximately 500 parts by weight of 93 percent sulfuric acid was added in dropwise fashion to the dispersed slurry of beads in propylene dichloride over a period of about 2 hours. The acidified slurry was maintained at 110° C. for an additional 4 hours, during which interval the propylene dichloride was distilled off and collected. At the end of this interval, 280 parts by weight of 70 percent sulfuric acid was added to the wet slurry beads to "quench" the sulfonation reaction. The reaction mixture was then permitted to cool for about 16 hours. The cooled beads were filtered from the liquors, and then were successively washed, with alternate filtrations, with more dilute portions of sulfuric acid of diminishing concentrations, until finally the beads were washed with water. The water-washed beads were then neutralized of any remaining sulfuric acid with dilute aqueous sodium hydroxide. The beads obtained were strong acid (sulfonated) cation exchange macroporous resin articles of this invention. The physical characteristics of such articles obtained and their effectiveness as ion exchange materials are given in table III below.

EXAMPLE 10

In this example, sulfonated strong acid cation exchange macroporous resin articles of the invention were provided through a "nonsolvent" sulfonation procedure as follows.

About 1,000 parts by weight of 99 percent sulfuric acid was heated and maintained at 90° C. Approximately 100 parts by weight of substantially dry macroporous resin beads polymerized as in example 9 above were added slowly to the hot sulfuric acid. At the end of this addition, the slurry provided was heated to 120° C. and maintained thereat for 6 hours. At the end of this interval, the slurry was "quenched"

with 70 percent sulfuric acid thus, substantially stopping the sulfonation reaction. The sulfonated resin macroporous beads so obtained were separated from the concentrated sulfuric acid liquors and successively washed with and separated from successively more dilute sulfuric acid. Finally, the beads were washed with water so as to remove any remaining acid. The washed strong acid (sulfonated) ion exchange macroporous resin articles of the invention thus produced were tested for physical and ion exchange properties as shown in table III below.

EXAMPLE 11

In this example, macroporous resin articles of the invention and strong acid (sulfonated) ion exchange macroporous resin articles of the invention were provided by following the procedure given above in example 9, however, with the sole recipe change that the amount of salt used in the aqueous phase mixture was doubled to about a 10 percent aqueous solution, i.e., 66 parts by weight, rather than 5 percent as in example 9. Interpolymerization took about 5.25 hours at 68°–70 C., followed by brief heat up to 80° C. The physical properties and ion exchange capacities of the macroporous ion exchange resin obtained in this example also are given in table III below.

EXAMPLE 12

The procedure employed in example 10 again was used in the example to provide strong acid (sulfonated) ion exchange macroporous resin articles of this invention; however, the amount of salt used in the aqueous phase mixture was raised from 5 percent to 10 percent, i.e., 66 parts by weight. The physical properties obtained and the ion exchange properties resulting from the strong acid cation exchange macroporous resin articles provided in this example are shown below in table III.

EXAMPLE 13

In this example, extremely fine particle-size macroporous resin articles and strong acid (sulfonated) macroporous resin articles of this invention were provided by following the procedure of example 10 with recipe differences noted below. No salt was used in the aqueous phase mixture.

| Component | Parts by Weight |
|---|---|
| Monomers Phase | |
| Styrene | 400 |
| Ethyl Vinyl Benzene | 92.4 |
| Divinyl Benzene | 107.6 |
| Benzoyl Peroxide | 3.0 |
| Sodium Bis (2ethyl hexyl sulfosuccinate) | 60.0 |
| Water | 36.0 |
| Aqueous phase | |
| Water | 760 |
| Boric Acid | 2.36 |
| Sodium Hydroxide | 0.65 |
| Gelatin | 3.0 |
| Gum Arabic | 4.6 |

The monomers phase was added to the aqueous phase, buffered at a pH of 9.0, at room temperature, about 23° C., with stirring to provide an oil-in-water-type emulsion. The emulsion was raised to and kept at 68° C. with stirring for about 3 hours to provide extremely fine, about 20 microns in size, articles of the invention. At the end of this period, water had to be added to disperse the resin, which because of its high water retention appeared to provide an almost dry mix. The dispersed resin was then washed and dried. Sulfonation following that of example 10 was pursued.

The properties, both physical and ion exchange, are as listed in table III below.

EXAMPLE 14

In this example, a gel resin of the prior art in the form of beads was provided by following the procedure of example 9, however, excluding the water and sodium dioctyl sulfosuccinate composite from the recipes of the monomers mixture. The physical and ion exchange properties of these gel resin beads of the prior art are as listed in table III below.

TABLE III.—PHYSICAL AND EXCHANGE PROPERTIES OF MACROPOROUS CATION EXCHANGE RESIN ARTICLES, EXAMPLES 9 TO 14

| Example | 9 | 10 | 11 | 12 | 13 | 14 |
|---|---|---|---|---|---|---|
| Mechanical strength, in grams [1] | 2,100+ | 1,498 | 1,616 | 1,286 | ([2]) | 450 |
| Deformation, in mils [3] | | 5.5 | 14.5 | 12.5 | ([2]) | 5 |
| Porosity, percent void volume of article volume [4] | 89 | 89 | 74.7 | 74.7 | 93 | <1 |
| Article density, in grams per milliliter [5] | 0.519 | 0.519 | 0.561 | 0.561 | 0.19 | 0.63 |
| Particle size distribution of articles, in U.S. standard sieve mesh in percent by weight of total beads: [6] | | | | | | |
| +16 | | 0.2 | 0.0 | 1.0 | ([2]) | 3.0 |
| +20 | 1.5 | 1.4 | 0.5 | 8.9 | | 19.0 |
| +30 | 30.0 | 25.3 | 18.5 | 14.4 | | [7] 80 |
| +40 | 42.1 | 42.0 | 30.4 | 46.2 | | 25 |
| +50 | 23.4 | 26.2 | 35.7 | 19.0 | | [7] 10 |
| −50 | 3.0 | 4.9 | 11.0 | 4.3 | | [7] 3 |
| Water retention in percent by weight of article [8] | 39 | 38 | 34.7 | 31.8 | 56.7 | 46 |
| Swell, in percent by volume of article [9] | 38 | 38 | 40 | 40 | 82 | 80 |
| Whole bead count, in percent by weight of all beads [10] | 100 | 92 | 77 | 75 | ([2]) | 95 |
| Ultimate ion exchange capacity to exchange exhaustion, [11] NaCl values: | | | | | | |
| Meq./g | 4.0 | 5.5 | 3.5 | 4.7 | 4.2 | 4.4 |
| Kgr./ft.[3] | 38.4 | 48.9 | 32.2 | 49.3 | 10.3 | 41.5 |
| Ion exchange operating capacity until leakage of ions, in kilograins per cubic foot [12] | 25.9 | 21.8 | 13.4 | 18.8 | | 23.7 |
| Oxidation stability to hydrogen peroxide, percent of beads not destroyed: [13] | | | | | | |
| H+ form of resin | 91.5 | 95.2 | | 94.2 | 90.4 | 4–8 |
| Na+ form of resin | 90.4 | 90.1 | 89.3 | 85.6 | | 26–29 |

[1] 30 mesh whole beads, force required to fracture.
[2] Size of articles, about 20 microns in diameter, prevent measurement of this property
[3] 30 mesh whole beads, diameter deformation at fracture point.
[4] Parrish dye method, supra.
[5] Weight/volume.
[6] "+" means retained by sieve screen; "−" means passes through sieve screen.
[7] Maximum.
[8] 100× (weight of water wet articles devoid of drainable water-weight of dry articles)/(weight of dry articles).
[9] −20/+30 mesh articles, swollen by benzene: 100× (volume swollen-volume dry)/(volume dry).
[10] 20 mesh articles: 100× (number of whole, i.e., nonfragmented, articles(/)total of articles); count by microscopic examination.
[11] ASTM-D1287-66T.
[12] ASTM-D1782-62T.
[13] Oxidants: aq. FeSO₄ and 3% aq. H₂O₂; 100× (weight after oxidant treatment)/(weight before oxidant treatment).

EXAMPLE 15

This example illustrates the preparation of a chloromethylated macroporous resin article of the invention which is suitable for later amination to provide a strong base anion exchange macroporous resin article as in example 16 or a weak base anion pocket-pore pearl resin article as in example 17.

The aqueous phase mixture was prepared separately from 660 g. of water buffered to a pH of 11.5 with 0.975 g. of sodium hydroxide and 6.29 g. of disodium phosphate. Protective colloid materials, 1.98 g. of gelatin and 3.96 g. of gum arabic, and a viscosity control agent, 1.1 g. of powdered high-viscosity hydroxymethyl cellulose (15,000 centipoise as a 2 percent aqueous solution), were dissolved in the buffered water, and held at 65° C.

A monomers phase mixture was prepared using the ingredients as listed in the following recipe:

| Ingredient | Parts by Weight |
|---|---|
| Styrene | 516 |
| Ethylene glycol dimethacrylate, a diolefinic cross-linking agent | 84 |
| Benzoyl peroxide, catalyst | 1.8 |
| Bis (2-ethyl hexyl) sulfosuccinate, micelle-forming solubilizer | 78 |
| Water, monomer-phobic precipitant | 78 |

The catalyst was dissolved in the monomers. Then the micelle-forming solubilizer was added and, upon its dispersion, the monomer-phobic precipitant was added and dissolved therein with heating at 65° C. for about 0.5 hour to form a single, clear phase "monomers mixture" of the invention.

The monomers mixture was added to the aqueous phase mixture with stirring so as to provide a suitable oil-in-water-type suspension. Stirring and heating at 65° C. was maintained until the polymer beads thus formed were heavier than tap water. The reaction system was then brought to 75° C. and held thereat for about one-half hour with stirring. Thereupon the reaction mixture was cooled to about 50° C. and 32 g. of sodium hydroxide was added to hydrolyze the sulfosuccinate therein and ease its removal from the macroporous resin articles by water washing. After about one-half hour, the reaction mixture was cooled to room temperatures, the reaction liquors were separated from the resin bead articles, and the latter were washed clean of liquors with water and dried in an oven at 101° C. overnight. The resin beads so obtained had internal structure such as is shown in FIG. 1.

Chloromethylation of the dried macroporous beads was carried out by dispersing 250 g. of the beads in 1 kg. of propylene dichloride, heating to 50° C., adding 12.5 g. of sulfuryl chloride, stirring at temperature for one-half hour, cooling to less than 25° C., adding 300 g. of methyl chloromethyl ether, adding 174 g. of aluminum chloride over an interval of one-half hour while maintaining the temperature at less than 25° C., stirring the reaction mixture at room temperature for about 4 hours and then quenching the chloromethylation reaction mixture with cold water. The chloromethylated articles of the invention where then separated from and washed free of the reaction liquors with water.

EXAMPLE 16

The chloromethylated macroporous resin articles provided in example 15 were dispersed in 338 g. of water to which 712 of 25 percent aqueous trimethylamine was added. The amination reaction mixture was stirred at room temperature for about 6 hours at the end of which interval remaining alkali was neutralized with 50 percent aqueous sulfuric acid and removal of any remaining propylene dichloride was affected by distillation. The macroporous strong base anion exchange resin articles of the invention so provided were washed free of reactants with water and had properties as listed in table IV below.

EXAMPLE 17

In similar manner to that employed in example 15, but using 528 g. of styrene at 72 g. of ethylene glycol dimethacrylate, water-washed chloromethylated macroporous resin articles of the invention were provided.

The chloromethylated beads were dispersed in 900 ml. of 50 percent aqueous sodium hydroxide to which 326 g. of diethylene triamine was then added. The amination reaction mixture was put under reflux for about 6 hours, at the end of which interval, the aminated bead articles were separated from the reaction liquors, washed with water, neutralized with aqueous sulfuric acid and separated from any occluded propylene dichloride which may have been carried over from the chloromethylation process. The weak base anion exchange resin articles of the invention so provided had properties as listed in table IV.

EXAMPLE 18

A strong base anion exchange resin was made in the manner set forth in examples 15 and 16, except that no precipitate and micelle-forming compounds were used during polymerization phase of example 15.

EXAMPLE 19

A weak base anion exchange resin was made in the manner set forth in examples 15 and 17 except that no precipitate and micelle-forming compounds were used during the polymerization phase of example 15.

The resins of examples 18 and 19 illustrate conventional anion exchange resins produced by suspension polymerization. As will be seen from the following table IV resins made in accordance to this invention, examples 16 and 17 as contrasted to conventional resins have superior mechanical properties, narrower distribution of bead size and greater formation of whole beads. In addition, table IV illustrates the superior anion-fouling characteristics of the resin of the invention as contrasted to conventional resins as shown by the results of the "TBCS" test (BP 860,695).

TABLE IV.—STRONG AND WEAK ANION EXCHANGE MACROPOROUS RESIN ARTICLES OF THE INVENTION

|  | Example 16 | Example 17 | Gel | |
|---|---|---|---|---|
|  |  |  | Resin 18 | Resin 19 |
| Mechanical strength, in grams | 320 | 602 | 110 |  |
| Deformation, in mils | 3.5 | 6.0 | 5.0 |  |
| Porosity, percent void volume of article volume | 30.0 | 57.5 | 3.35 |  |
| Article density, salt form, in grams/milliliter | 0.238 | 0.331 | 0.350 | 0.420 |
| Particle size distribution, in U.S. standard sieve mesh, in percent by weight of total beads: |  |  |  |  |
| +16 | Trace | Trace | 1.0 | 0.4 |
| +20 | 7.0 | 1.1 | 30.5 | 18.0 |
| +30 | 74.5 | 41.2 | 45.1 | 46.9 |
| +40 | 17.6 | 52.4 | 20.0 | 30.6 |
| +50 | 0.5 | 4.7 | 3.0 | 3.9 |
| −50 | 0.4 | 0.6 | 0.4 | 0.2 |
| Water retention, in percent by weight of article | 63.1 | 50.7 | 52.3 | 42.7 |
| Whole bead count, in percent by weight of all beads | 100 | 100 | 78 | 77 |
| Anion exchange operating capacity until leakage of anions, in kg./ft.$^3$ | 10 | 24.4 | 17.5 | 25.8 |
| Tert. butyl catechol sulfonic acid test, "TBCS" (British Pat. 860,695), in meq./ml.:[1] |  |  |  |  |
| 1 | 0.53 | 0.46 | 0.33 | 0.08 |
| 2 | 0.48 | 0.51 | 0.20 | 0.06 |
| 3 | 0.48 | 0.38 | 0.14 | 0.05 |
| 4 | 0.44 | 0.34 | 0.11 | 0.04 |
| 5 | 0.36 | 0.28 | 0.08 | 0.04 |

[1] This test indicates resistance of macroporous resins to pore fouling by large organic molecules, with the higher values proportional to greater resistance to such fouling.

EXAMPLES 20 and 21

Bulk Polymerization Using Acetamide and Ethylene Glycol as Precipitants

While the previous examples showed the use of water as the monomers-phobic component of the micellular composite, other monomers-phobic precipitants may be employed, such as acetamide in example 20 and monomers-insoluble glycols, such as ethylene glycol in example 21. Again, not only may suspension and emulsion polymerization techniques be used to provide macroporous resin articles of the invention, but also bulk polymerization, such as was outlined above and in FIG. 3, Route I. These examples illustrate bulk methods.

EXAMPLE 20

A monomers mixture was prepared with 192 g. of styrene, 60 g. of divinyl benzene and 48 g. of ethyl vinyl benzene. To this was added 3.0 g. of benzoyl peroxide catalyst and 30 g. of powdered sodium bis (2-ethyl hexyl) sulfosuccinate solubilizer component, which ingredients dissolved upon mixing at room temperatures. The monomers-phobic precipitant component, 27 g. of acetamide, was then added. The reaction mixture was put under a blanket of dry nitrogen gas (to exclude atmospheric water vapor and so study the effect of acetamide along as the precipitant component) and was then heated to 90° C. As the temperature rose, the dispersed acetamide powder melted and was taken up in the micelles of the solubilizer so as to form a clear single phase monomers mixture. As heating progressed at 90° C., the monomers phase became increasingly more cloudy, until after an effective interval, the mass of monomers had polymerized to an opaque resinous bulk. The macroporous bulk resin article of the invention so provided was removed from the glass reaction vessel by breaking away the glass. The internal structure of the article is as shown in FIG. 1.

To facilitate preparation of a sulfonated macroporous cation exchange resin of this invention from the foregoing bulk resin article, the latter was comminuted to particles in the U.S. Standard Sieve mesh range of −20/+50 mesh. About 70 g. of the resin particles, after washing and drying, were slowly added to 700 g. of 99 percent sulfuric acid at 90° c. The reaction admixture was brought to 120° C. and held there for about 6 hours to provide the desired cation exchange resin particulate articles of the invention. The usual washing and separation steps were pursued as given above in example 10.

The cation exchange resin articles in sodium salt form, had a porosity of about 23.3 percent pores (0.233±0.011 ml./g. of dry particulated resin) and an ultimate exchange capacity of 27.3 kgr./ft.$^3$ of wet resin or 4.4 meg./gm. of dry resin.

EXAMPLE 21.

The procedure of example 20 was substantially repeated, however, 1.5 g. of benzoyl peroxide was used together with the aforesaid monomers mixture, and 30 g. of ethylene glycol, a nonaqueous liquid monomers-phobic precipitant, was used in place of the solid acetamide. The opaque bulk macroporous resin article obtained was washed, dried, comminuted, sulfonated and converted to the sodium salt form to provide articles of the invention which had a porosity of about 23.9 percent by volume (0.239±0.006 ml./g. of dry resin).

Comparison of pore diameters using the mercury fill method for typical strong cation exchange resin beads of the prior art channel-pore type and of the macroporous articles of this invention, both prepared with styrene, divinyl benzene and ethyl vinyl benzene of equivalent chemical compositions (the channel-pore type prepared by the process of British Pat. No. 932,125 and the macroporous type of this invention prepared as in example 10 above) showed ranges in Angstroms of 150–300 for the channel-pores and 700–3,000 for the macropores of the resin of this invention.

Examination of electronmicrographs of the macroporous resin article of this invention, as illustrated by FIG. 1, showed constructed intercommunicating channels with exemplary diameters in the range of 80–700 Angstroms between adjacent large pores which channels almost invariably were adjacent to the defining walls of each large pore and which defining walls extended in a somewhat parallel direction to the channels, thus providing openings between adjacent large pores.

In general, monomers which may be employed to provide the macroporous resin articles of the invention include any of the monoethylenically unsaturated cross-linking, i.e., polyolefinic, monomers which may be interpolymerized by free-radical type initiation and propagation reactions well known in the art. Among these, one may number the mono-olefinic monomers listed in British Pat. No. 932,125, page 4 at lines 45 to 91 selected from the group consisting of monovinyl aromatic hydrocarbons, acrylic esters and methacrylic esters, and the polyolefinic monomers listed therein at lines 92 to 119 selected from the group consisting of polyvinyl aromatic hydrocarbons, polyhydric alcohol polymethacrylates and polyhydric alcohol polyvinyl ethers. The most preferred mono-olefinic monomers are styrene and the alkyl vinyl-or-allylic benzenes, such as those having one to six carbons in the alkyl group. Most preferred among the polyolefinic cross-linking monomers are the divinyl, diallylic or vinyl-allylic monomers, which may be aromatic such as the sundry substituted and unsubstituted divinyl benzenes, and the linear diolefinic monomers such as the divinyl, diallylic or vinyl-allylic monomers like the diacrylate or dimethacrylate esters, or the divinyl or diallylic or vinyl-allylic ethers such as the divinyl or diallylic or vinyl-allylic ethers of polyhydric alcohols such as glycol, or their combinations or admixtures.

Suitable catalysts which function as reaction initiators in this invention include free radical generating compounds such as, for example, benzoyl peroxide, tert-butyl hydroperoxide, cumene peroxide, tetralin peroxide, acetyl peroxide, caproyl peroxide, tert-butyl perbenzoate, tert-butyl diperphthalate, methyl ethyl ketone peroxide, and the like.

Another suitable class of free radical generating compounds useful as reaction initiators in this invention are the azo catalysts. For example, azodiisobutyronitrile, azodiisobutyramide, azo bis (αα-dimethylvaleronitrile), azo bis (α-methylbutyronitrile), dimethyl, diethyl or dibutyl azo bis (methylvalerate).

Another method of initiating the polymerization of the compositions of this invention lies in the use of ultraviolet light and a suitable catalyst such as benzoin, azoisobutyronitrile and the like. Yet another suitable class of reaction initiators are the water-soluble free radial compounds such as, for example, the alkali metal and ammonium persulfates and azobisisobutyric acids.

The reaction initiators may be added to the monomer phase or the aqueous phase or may be added after the monomer and aqueous phases have been combined. The reaction initiators may be used in proportions ranging from 0.01 to 3 percent by weight of the monomers. It is preferred to use the reaction initiators in the range of 0.2 to 1.5 percent by weight of the monomers.

Polymerization is carried out at elevated temperatures in the preferred embodiments of this invention. Polymerization temperatures may range between 65° and 90° C. it being preferred to polymerize around 72° C. for best control over the polymerization rate.

In joining products by suspension polymerization in accordance with this invention, it has been found highly desirable to maintain the aqueous phase at a pH of between about 9 and about 12. The preferred range of pH is 10.5 to 11.5. Buffer systems used for pH control are those well known in the art such as, for example, phosphates of sodium or sodium hydroxide and boric acid.

As shown by the examples, copolymerization may be of a bulk, emulsion or suspension type. The usual techniques known in the art for pursuing such copolymerizations may generally be employed here to provide articles of the invention with desired specific shapes, sizes, chemical compositions, etc.

Choice of the precipitant to be used with any desired combination of interpolymerizable mono-olefinic and polyolefinic cross-linking monomers, as taught herein, may be any chemical entity which follows the prescription of being both monomer and polymer insoluble at the interpolymerization temperatures, of being capable of being taken up completely by the micelles of the solubilizer component employed so as to be completely solubilized in the monomers phase during interpolymerization, and of being substantially inert to other chemical reactions with the chemical entities present in the monomers phase.

Among these we have found that the precipitants water, acetamide, succinonitrile, methyl sulfate and monomer insoluble glycols such as ethylene glycol are especially suitable for use in monomers mixtures in which they are insoluble. In general, one may use a large difference in the dielectric constant between that of the mixture of monomers to be interpolymerized and that of proposed precipitants as a guide to the monomers-phobicity of the precipitant; for example, where systems (exemplified above) have mixtures of monomers in the range of dielectric constants of from about 2 to 4, the precipitant water has a dielectric constant of about 40 and the precipitant acetamide has a dielectric constant of about 59 (at 83° C., just above its melting point), a high monomer-phobicity is indicated for the precipitants in the monomers mixtures employed. This was demonstrated in examples 1 to 19. Those precipitants which may be soluble in the simple aromatic monomers employed above, are useful in yet other monomers systems in which they are insoluble, such as use of furfural with mixtures of highly alkyl substituted (such as di- and tri-substituted benzene vinyl) monomers in which it is insoluble.

Thus, by employing the criteria of differences in dielectric constant, insolubility in monomers, micelle solubility and inertness at the interpolymerization temperatures, one may select by these teachings an appropriate precipitant component for any system of free-radical interpolymerizable monomers to provide the macroporous resin articles of this invention.

Choice of the micelle-forming solubilizer to be used with any desired combination of interpolymerizable mono-olefinic and polyolefinic cross-linking monomers, a specific suitable monomers-phobic precipitant and a specific interpolymerization technique, as taught herein, may be any micelle-forming chemical entity which follows the prescription of being soluble in the monomers employed at concentrations above its critical micelle-forming concentration, insoluble in the interpolymer formed, be capable of taking up or solubilizing the monomer-phobic precipitant employed and being otherwise chemically inert to reaction with the chemical entities present in the monomers phase.

Among these we have found that the solubilizers sodium bis (2-ethyl hexyl) sulfo succinate, other bis esters having from about four to 18 carbon atoms of sodium sulfosuccinic acid and dodecylammonium butyrate, oleat or formate are especially useful, having a relatively low critical micelle-forming concentration in most common monomers which are employable in practice of this invention, and being capable of solubilizing relatively large concentrations of the more common monomer-phobic precipitants in such systems.

Critical micelle-forming concentration, as used herein, is that concentration of micelle-forming compound which will cause monomers to go into solution in a medium in which such monomers are otherwise insoluble. Although the critical micelle-forming concentration may differ with differing solubilizers, it is readily apparent to one skilled in the art when insufficient solubilizer is used since a clear solution of monomers and precipitants will be unobtainable, even with heating. The critical micelle concentration can be easily achieved in such a case by simply adding additional solubilizer to the monomers mixture until a clear solution is obtained. Excess solubilizer is not detrimental in the practice of this invention although best results are obtained when the amount of solubilizer is maintained within the preferred limits as disclosed in table II. In the case of the preferred solubilizer sodium bis (2-ethyl hexyl) sulfo succinate and the precipitant water, the former is capable of solubilizing water in most common aromatic monomers in as great a ratio by weight of precipitant/solubilizer as 1/1.

Those knowledgeable in the art will readily see from the foregoing detailed explanations and teachings that many changes in types and concentrations of monomers, solubilizers, precipitants, adjuvants, orders of addition of reactants, temperatures and so forth may be made beyond the specific modes of practice set out to provide the macroporous organic cross-linked resin articles of this invention to meet specific needs as to chemical composition, porosity, ion exchange or absorbency, oxidation or resistance to depolymerization properties, resistance to organic or inorganic foulants, diffusivity, mechanical strength, water retention, absence of post-treatment to ease polution problems and so forth, and yet fall within the broad concept of this invention as is defined in the appended claims.

1. A process for the preparation of cross-linked copolymer beads suitable for conversion to ion exchange resins having improved mechanical properties, improved chemical properties and increased porosity which comprises the steps of
   a. forming a liquid monomer phase comprising
      i. a mixture of mono-olefinic monomer and a polyolefinic monomer which are miscible and copolymerizable, said mono-olefinic monomer selected from the group consisting of mono-vinyl aromatic hydrocarbons, acrylic esters and methacrylic esters and said polyolefinic monomer selected from the group consisting of polyvinyl aromatic hydrocarbons, polyhydric alcohol polymethacrylates and polyhydric alcohol polyvinyl ethers,
      ii. an inert, monomer-soluble, copolymer insoluble, micelle-forming solubilizer in an amount equal to at least the critical micelle-forming concentration of said solubilizer in said monomer,
      iii. a monomer-insoluble, copolymer insoluble precipitant in the liquid state selected from the group consisting of water, acetamide, succinonitrile, methyl sulfate, furfural and monomer insoluble glycols, said precipitant being present in proportions so as to be solubilized by said solubilizer in said monomer mixture at polymerization temperature;
   b. forming an aqueous phase comprising
      i. a major portion of water,
      ii. a minor portion of water soluble colloid to prevent agglomeration of said monomer and polymer beads subsequently formed therefrom, and
      iii. a buffer system to maintain said aqueous phase at a pH of between about 9 and about 12;
   c. combining said monomer phase and said aqueous phase to form a dispersion of said monomer phase in said aqueous phase and adding thereto a free radical generating compound as a reaction initiator;
   d. heating said suspension to polymerization temperature of between about 65° and 90° C. while stirring said dispersion to form a multiplicity of macroporous polymer beads; and
   e. separating said macroporous beads from remaining reaction liquors.

2. The process of claim 1 wherein said precipitant and said solubilizer are present in said monomer phase in a ratio of 1:1 by weight with respect to one another.

3. The process of claim 1 wherein said precipitant and said solubilizer together comprise from about 4 to 60 percent of said monomer phase, the percentage being based on the weight of said monomers.

4. The process of claim 1 wherein said precipitant and said solubilizer together comprise 40 percent of said monomer phase, the percentage being based on the weight of said monomers.

5. The process of claim 1 wherein said precipitant is water and said solubilizer is sodium (2-ethyl hexyl) sulfosuccinate.

6. The process of claim 1 wherein said precipitant is acetamide.

7. The process of claim 1 wherein said precipitant is ethylene glycol.

8. The process of claim 1 wherein said mono-olefinic monomer is selected from the group consisting of styrene, ethyl vinyl benzene and mixtures thereof and said polyolefinic monomer is divinyl benzene.

9. The process of claim 1 wherein said mono-olefinic monomer is styrene and said polyolefinic monomer is ethylene glycol dimethacrylate.

10. The process of claim 1 wherein said polyolefinic monomer comprises from about 12 to about 20 percent by weight of said monomers.

11. The process of claim 1 wherein said aqueous phase comprises sodium chloride ranging from about 0.1 to about 10 percent by weight of said water as a deemulsification agent thereby to promote the formation of discrete macroporous beads.

12. The process of claim 11 wherein said sodium chloride comprises 5 percent of said aqueous phase, the percentage being based on the weight of said water.

13. The process of claim 11 wherein said sodium chloride comprises 10 percent of said aqueous phase, the percentage being based on the weight of said water.

14. The process of claim 1 wherein the pH of said aqueous phase is between 10.5 and 11.5.

15. The process of claim 1 wherein said reaction initiator is present in proportions ranging from about 0.01 to about 3 percent, the percentage being based on the weight of said monomers.

16. The process of claim 1 wherein said reaction initiator is present in proportions ranging from about 0.2 to about 1.5 percent, the percentages being based on the weight of said monomers.

17. The process of claim 1 wherein said reaction initiator is benzoyl peroxide.

18. A process for the production of cross-linked macroporous copolymers, suitable for conversion to ion exchange resins, which comprises polymerizing in bulk a homogenous mixture consisting of a mono-olefinic monomer selected from the group consisting of monovinyl aromatic hydrocarbons, acrylic esters and methacrylic esters; a polyolefinic monomer selected from the group consisting of polyvinyl aromatic hydrocarbons, polyhydric alcohol polymethacrylates and polyhydric alcohol polyvinyl ethers; and inert, monomer soluble, polymer-insoluble micelle-forming solubilizer in an amount equal to at least the critical micelle-forming concentration of said solubilizer in said mixture; a monomer-insoluble, polymer-insoluble precipitant selected from the group consisting of acetamide, succinonitrile, methyl sulfate, furfural and monomer insoluble glycols; and a free radical generating compound as a reaction initiator, stirring said mixture until said monomers have polymerized to an opaque mass.

19. The process of claim 18 wherein said mixture is heated to a temperature of between about 65° and 90° C. during polymerization.

20. The process of claim 18 wherein said precipitate is acetamide.

21. The process of claim 18 wherein said precipitate is ethylene glycol.

* * * * *